(12) United States Patent
Kikuchi et al.

(10) Patent No.: US 8,647,450 B2
(45) Date of Patent: Feb. 11, 2014

(54) LIGHTWEIGHT AND EXCELLENT DUCTILE BEAD WIRE, METHOD FOR PRODUCING THE SAME AND LIGHTWEIGHT TIRE

(75) Inventors: Masami Kikuchi, Kurume (JP); Yukio Aoike, Kodaira (JP); Takashi Yokoi, Kawasaki (JP)

(73) Assignee: Bridgestone Corporation, Tokyo (JP)

( * ) Notice: Subject to any disclaimer, the term of this patent is extended or adjusted under 35 U.S.C. 154(b) by 977 days.

(21) Appl. No.: 12/296,597

(22) PCT Filed: Feb. 22, 2007

(86) PCT No.: PCT/JP2007/053298
§ 371 (c)(1),
(2), (4) Date: Nov. 3, 2008

(87) PCT Pub. No.: WO2007/129501
PCT Pub. Date: Nov. 15, 2007

(65) Prior Publication Data
US 2009/0277558 A1 Nov. 12, 2009

(30) Foreign Application Priority Data
Apr. 11, 2006 (JP) ................. 2006-108778

(51) Int. Cl.
C22C 38/04 (2006.01)
C22C 38/00 (2006.01)
C21D 9/52 (2006.01)
C22C 38/06 (2006.01)
B60C 15/00 (2006.01)

(52) U.S. Cl.
USPC ............. 148/329; 148/337; 148/598; 420/72; 420/77; 152/540

(58) Field of Classification Search
USPC ........ 148/329, 333, 337, 598; 420/72, 74, 77, 420/79; 152/540
See application file for complete search history.

(56) References Cited

U.S. PATENT DOCUMENTS 6,264,759 B1 7/2001 Bae et al.
6,418,994 B1 7/2002 Arnaud et al.

FOREIGN PATENT DOCUMENTS

| EP | 0 411 061 | | 2/1991 |
| FR | 1435958 A | * | 6/1966 |
| JP | 3-500306 A | | 1/1991 |
| JP | 2000-80441 A | | 3/2000 |
| JP | 2005-15909 A | | 1/2005 |
| WO | 90/00630 A1 | | 1/1990 |

OTHER PUBLICATIONS

Sato, Y., English machine translation of JP 2000-080441, Mar. 2000, whole document.*
Davis, J., "Wire, Rod, and Tube Drawing", Metals Handbook, 2002, ASM International, p. 1-5.*
Loire Atel Forges, English machine translation of FR 1435958, Jun. 1966, whole document.*
R. Umino et al., "Experimental Determination and Thermodynamic Calculation of Phase Equilibria in the Fe—Mn—Al System", Journal of Phase Equilibria and Diffusion, vol. 27, No. 1, Feb. 2006, pp. 54-62, (XP-002519939).
A. Inoue et al., "Microstructure and Mechanical Properties of Metastable Austenite Wires in Fe—Mn—Cr—Al—C System Produced by the In-rotating-water Spinning Method", Transactions of the Iron and Steel Institute of Japan, vol. 25, No. 10, 1985, pp. 1069-1077, (XP002520461).

* cited by examiner

*Primary Examiner* — Roy King
*Assistant Examiner* — Caitlin Kiechle
(74) *Attorney, Agent, or Firm* — Sughrue Mion, PLLC

(57) ABSTRACT

A bead wire has a composition of Mn: 5-35 at % and Al: 5-20 at % and the remainder being Fe and inevitable impurities, in which a steel structure is an austenite single-phase structure, and achieves weight reduction and high ductility without reducing strength.

5 Claims, No Drawings

LIGHTWEIGHT AND EXCELLENT DUCTILE BEAD WIRE, METHOD FOR PRODUCING THE SAME AND LIGHTWEIGHT TIRE

TECHNICAL FIELD

The present invention is intended to achieve weight reduction and high ductility of a bead wire.

In addition, the present invention achieves weight reduction of a tire by using the above-mentioned bead wire.

RELATED ART

Recently, from the viewpoint of global environment conservation, it is demanded to improve fuel consumption of an automobile. Therefore, the weight reduction of an automobile body is actively proceeding.

Simultaneously, it is demanded to reduce the weight of a tire for the automobile. Various approaches are considered to the weight reduction of the automobile tire, and one of the effective approaches is to reduce the weight of a bead core used in the tire.

The gross weight of a general tire for passenger cars is about 12 kg, and the weight in total of two bead cores occupied in the tire is about 1 kg. Moreover, the bead core usually comprises a bead wire made of steel wires and a rubber member covering its surface.

In order to reduce the weight of the bead core, it is considered to enhance the tension of the bead wire as a material of the bead core. In order to enhance the tension of the bead wire, it is required to make the bead wire fine by a drawing process, but the ductility of the bead wire is deteriorated with such a drawing.

Therefore, when the bead core manufactured by using such a fine bead wire is mounted on a rim, since the sufficient ductility can not be expected, there is a fear of breaking a part of the bead wire.

In addition, a high stiffness is required as a characteristics of the bead wire. Only from the viewpoint of the stiffness, it is enough to increase the wire diameter, but a sufficiently high strength can not be obtained.

DISCLOSURE OF THE INVENTION

Problems to be Solved by the Invention

The present invention is developed in light of the above-mentioned fact and is to provide a bead wire capable of achieving weight reduction and high ductility without reducing strength by a new alloy design.

Also, the present invention is to provide a tire achieving reduction in weight by using the above-mentioned bead wire.

Means to Solve the Problems

The inventors have tried a new alloy design about the bead wire in order to achieve the above-mentioned objects and found that the desired objects are advantageously achieved by using FeMnAl based composition and rendering its steel structure into an austenite single-phase structure.

It is described in more detail as follows.

(a) By including relatively large quantity of Mn and Al as a composition of the bead wire, it is possible to reduce the weight of the bead wire.

(b) By rendering the steel structure into an austenite single-phase structure in the above-mentioned FeMnAl based composition, it is possible to obtain a high ductility as well as a high strength.

(c) By precipitating fine carbides in steel, the movement of dislocation becomes smooth and hence the ductility is further improved.

(d) By further including Cr, it is possible to advantageously improve corrosion resistance.

The present invention is based on the above-mentioned knowledge.

That is, the summary of the present invention is as follows.

(1) A lightweight and excellent ductile bead wire having a composition of
   Mn: 5-35 at % and
   Al: 5-20 at %
, and the remainder being Fe and inevitable impurities, in which a steel structure is an austenite single-phase structure.

(2) A lightweight and excellent ductile bead wire having a composition of
   C: 0.1-1.5 at %,
   Mn: 5-35 at % and
   Al: 5-20 at %
, and the remainder being Fe and an inevitable impurities, in which a steel structure is an austenite single-phase structure and fine carbides are included in the austenite single-phase structure.

(3) A lightweight and excellent ductile bead wire according to the above (1) or (2), wherein the composition further contains Cr: 1-7 at % as an additional component.

(4) A method for producing a lightweight and excellent ductile bead wire, which comprises rolling a steel ingot having a composition as described in any one of the above (1) to (3) to form a wire rod, cooling the wire rod, heating to a temperature of 900-1100° C., quenching to render a steel structure into an austenite single-phase structure, drawing and then subjecting to a bluing treatment.

(5) A lightweight tire comprising a bead wire as described in any one of the above (1) to (3).

Effects of the Invention

According to the present invention, by using FeMnAl based composition can be reduced the specific gravity of the wire as compared with that of the conventional ones, so that it is possible to achieve the weight reduction of the bead wire and hence a tire.

In addition, according to the present invention, by rendering the steel structure into an austenite single-phase structure can be obtained a high strength and a high ductility simultaneously. This effect is further improved by precipitating fine carbides in steel.

Furthermore, the bead wire according to the present invention is high in the strength and ductility, so that even if the diameter is made larger than that of the conventional one, it is possible to ensure a ductility enough to be mounted onto a rim in addition to the required strength, and as a result, it is possible to achieve reduction of the winding number as the bead core and hence improvement of productivity. Also, by increasing the diameter is achieved the improvement of stiffness.

Moreover, when fine carbides are precipitated in steel, since these carbides have magnetism, it is possible to conduct handling using a magnetic force in the formation step of the bead wire, which results in improvement of workability and productivity.

BEST MODE FOR CARRYING OUT THE INVENTION

The present invention will be described in detail below.

At first, the reason why the component composition of the bead wire in the present invention is limited to the above-mentioned range will be described.

Mn: 5-35 at %

In the present invention, Mn is an essential element in combination with Al content for obtaining an austenite ($\gamma$) phase at a high temperature above 900° C., When the Mn content is less than 5 at %, a phase other than austenite is formed and it is difficult to ensure sufficient elongation, while when it exceeds 35 at %, the austenite ($\gamma$) phase cannot be obtained at a high temperature above 900° C. but also the steel becomes disadvantageously brittle. Therefore, Mn is included in a range of 5-35 at %. More preferably, Mn is a range of 10-25 at %.

Moreover, Mn has an effect of weight reduction because the specific gravity is smaller than that of Fe.

Al: 5-20 at %

Al is a main element included for lowering the specific gravity of the wire for weight reduction. When the Al content is less than 5 at %, a sufficient effect of weight reduction is not obtained, while when the Al content exceeds 20 at %, the austenite ($\gamma$) phase cannot be obtained at a high temperature above 900° C. but also the lowering of elongation is brought. Therefore, Al is included in a range of 5-20 at %. More preferably, Al is a range of 8-18 at %.

C: 0.1-1.5 at %

C is an element useful for achieving the reinforcing effect by precipitating fine carbides in the order of nanometer in steel and at the same time smoothening the movement of dislocation to improve the ductility. However, when the C content is less than 0.1 at %, the addition effect is poor, while when it exceeds 1.5 at %, the steel is too hardened and the ductility is rather deteriorated. Therefore, C is included in a range of 0.1-1.5 at %. More preferably, C is a range of 0.3-1.3 at %.

Cr: 1-7 at %

The addition of Cr effectively not only improves the corrosion resistance, which mitigates the production steps of a tire but also can control the separation between the bead wire and rubber effectively.

However, when the Cr content is less than 1 at %, the corrosion resistance as the addition effect is poor, while when it exceeds 7 at %, the workability is deteriorated. Therefore, Cr is included in a range of 1-7 at %. More preferably, Cr is a range of 2-5 at %.

Although the above is explained with respect to the basic components and selective components, according to the present invention, it is not satisfied only by controlling the component composition of the bead wire to the above-mentioned ranges, and it is important to render the structure into an austenite single-phase structure.

Namely, in the FeMnAl based alloy steel according to the present invention, high strength and high ductility can be obtained together by forming an austenite single-phase structure through heating-quenching treatments as described below.

Although the reason is not fully explained, as regards the high ductility, it is considered that the movement of dislocation becomes smooth due to the fact that the dislocation is easily moved by the formation of FCC structure and the entanglement in the movement of dislocation is suppressed by dispersion of nano-size carbides, and as regards the high strength is considered the reinforcing effect by dispersion of nano-size carbides.

Moreover, the austenite single-phase structure in the present invention means that substantially more than 99% of the structure is an austenite structure.

In addition, when an appropriate quantity of C is included in steel, FeAlC based carbides are finely precipitated in the order of nanometer by the above heating-quenching treatments. These fine carbides have an effect of smoothening the movement of dislocation and contribute to improve the ductility very effectively.

Next, a preferable method for producing the bead wire according to the present invention will be described.

In the present invention, steps other than the heating-quenching treatments for rendering the steel structure into an austenite single-phase structure may be conducted according to usual manner and is not particularly limited.

A steel ingot adjusted to the above-mentioned preferable component composition is rolled to form a wire rod having a diameter of about 4.0-7.0 mm$\phi$.

Then, the wire rod is subjected to heating-quenching treatments for rendering the steel structure into an austenite single-phase structure, which is particularly important in the present invention.

At first, the wire rod obtained as mentioned above is heated to a temperature of 900-1100° C. When the heating temperature is lower than 900° C., the wire rod may not always reach an austenite temperature region, and also an alloying element or compound is not solid-soluted in austenite completely and hence the austenite single-phase structure can not be formed by the subsequent quenching treatment. While, when it exceeds 1100° C., micro-voids are formed in a crystal part and with these voids being origins, larger-size precipitates (carbides and so on) are formed to bring about significant deterioration of workability, Therefore, the heating temperature is limited to a range of 900-1100° C.

Also, the quenching treatment is not particularly limited, but water cooling, oil quenching, cooling in salt bath, spray cooling, fluidized bed treatment and the like are preferable.

Particularly, from the viewpoint of cooling ability, environment and workability, the water cooling is most preferable.

After the above heating-quenching treatments, the wire rod is finished to a wire having a diameter of about 2.0-1.0 mm+$\phi$ by a drawing process of about ten paths.

Then, the wire is subjected to a bluing treatment at a temperature of around 400° C. to form a bead wire.

Thus, there can be obtained a bead wire having a high strength and an excellent ductility.

In order to apply the above-mentioned bead wire to a tire, the bead wire is first pickled to clean its surface, which is then subjected to CuSn or CuZn based plating. This plating process may be carried out according to a usual manner, and the plating is usually conducted with a coating weight of about 0.4-1.5 g/mm$^2$.

Then, the wire is wound several times according to the wire diameter while coating the surface of the wire with rubber to form a bead core, and the resulting bead core is applied to the tire.

In the formation of such a bead core, since the bead wire according to the present invention is excellent in the strength and ductility, even if the diameter is made larger than that of the conventional one, the ductility enough to be mounted on a rim can be ensured, and hence it is possible to reduce the winding number as the bead core.

In other words, according to the conventional technique, the wire should be thinned to have a diameter of about 0.9-2.0 mmφ in order to obtain is the desired strength. On the contrary, since the ferroalloy of the present invention is excellent in the strength and ductility, even when the diameter of the wire is about 1.5-3.5 mmφ, there can be obtained the strength equal to and the ductility more excellent than those of the conventional one.

In the conventional technique, a bead ring is formed by winding 12-25 times when the diameter of the wire is 1.26 mmφ. In the bead wire according to the present invention, however, the equal strength is obtained even at the diameter of 2 mm, so that a bead ring having the same volume can be formed by winding 5-10 times.

In addition, when the bead wire of the present invention is drawn to the same level as in the conventional wire, a higher tensile strength can be obtained and also the reduction of a bead core section can be expected.

Example 1

Steel ingots having various component compositions as shown in Table 1 are rolled to wire rods having 5.5 mmφ, respectively. Then, the wire rod is subjected to a heating treatment at 1100° C. for 5 minutes and quenched to render the steel structure into an austenite single-phase structure. Next, the wire rod is drawn to form a thin wire of 1.26 mmφ, which is subjected to a bluing treatment at 460° C. to form a bead wire.

With respect to the thus obtained bead wires are examined the tensile strength, ductility and degree of weight reduction to obtain results as shown in Table 1.

Moreover, the evaluation method of each characteristic is as follows.

Tensile Strength and Ductility

Each of them is measured by a test according to JIS G 3510.

Degree of Weight Reduction

A conventionally general bead wire (component composition C: 3.3 at %, Mn: 0.5 at %, remainder: Fe, specific gravity: 7.87 g/cm$^3$) is used as a control material, and the degree of weight reduction is represented by a percentage obtained by dividing a difference in specific gravity between the control material and the bead wire to be tested by the specific gravity of the general bead wire.

TABLE 1

| No. | Component Composition (at %) | | | | Tensile Strength (MPa) | | Ductility (%) | | Specific Gravity (g/cm$^3$) | Degree of Weight Reduction (%) | Rearks |
| | C | Mn | Al | Cr | After Heating | Bead Wire | After Heating | Bead Wire | | | |
| --- | --- | --- | --- | --- | --- | --- | --- | --- | --- | --- | --- |
| 1 | 0.05 | 20.0 | 14.0 | — | 525 | 1280 | 41 | 20 | 6.88 | 12.6 | Example |
| 2 | 0.05 | 35.0 | 14.0 | — | 510 | 1270 | 43 | 21 | 6.86 | 12.8 | Example |
| 3 | 0.05 | 5.0 | 14.0 | — | 535 | 1290 | 41 | 20 | 6.90 | 12.3 | Example |
| 4 | 0.05 | 20.0 | 20.0 | — | 590 | 1285 | 40 | 19 | 6.50 | 17.4 | Example |
| 5 | 0.05 | 20.0 | 5.0 | — | 520 | 1250 | 41 | 20 | 7.49 | 4.8 | Example |
| 6 | 0.05 | 20.0 | 25.0 | — | 580 | 1350 | 25 | 11 | 6.20 | 21.2 | Comparative Example |
| 7 | 0.05 | 20.0 | 2.0 | — | 505 | 1225 | 42 | 21 | 7.70 | 2.2 | Comparative Example |
| 8 | 0.05 | 20.0 | 14.0 | 5.0 | 540 | 1250 | 39 | 19 | 6.85 | 13.0 | Example |
| 9 | 1.0 | 20.0 | 14.0 | — | 1010 | 2110 | 36 | 18 | 6.84 | 13.1 | Example |
| 10 | 1.5 | 20.0 | 14.0 | — | 1105 | 2250 | 33 | 16 | 6.81 | 13.5 | Example |
| 11 | 0.1 | 20.0 | 14.0 | — | 915 | 1920 | 38 | 19 | 6.88 | 12.6 | Example |
| 12 | 2.0 | 20.0 | 14.0 | 5.0 | 1200 | 2500 | 20 | 10 | 6.76 | 14.1 | Comparative Example |
| 13 | 1.0 | 20.0 | 14.0 | 5.0 | 1020 | 2150 | 36 | 18 | 6.80 | 13.6 | Example |
| 14 | 3.3 | 0.5 | — | — | 1000 | 2127 | 7 | 7 | 7.87 | 0 | Conventional Example |

As shown in Table 1, all of the bead wires obtained according to the present invention achieve the weight reduction of 4.8-17.4%. In addition, it is confirmed that sufficient tensile strength and high ductility are obtained.

Furthermore, the bead wire of No. 13 in Table 1 is pickled and subjected to CuSn based plating with a coating weight of 1.0 g/mm$^2$ while covering its surface with rubber, and then wound 12 times to form a bead wire, which is applied to a tire.

With regard to the thus obtained tire, the degree of weight reduction as a whole of the tire is examined in the same manner as described above.

As a result, the gross weight of the conventional tire is 11.80 kg, while the gross weight can be reduced to 11.67 kg (degree of weight reduction: 1.1).

The invention claimed is:

1. A lightweight and excellent ductile bead wire for a bead core in a tire having a composition of
Mn: 5-35 at % and
Al: 14-20 at %,
and the remainder being Fe and inevitable impurities, in which a steel structure is an austenite single-phase structure.

2. A lightweight and excellent ductile bead wire for a bead core in a tire having a composition of
C: 0.1-1.5 at %,
Mn: 5-35 at % and
Al: 14-20 at %,
and the remainder being Fe and an inevitable impurities, in which a steel structure is an austenite single-phase structure and fine carbides are included in the austenite single-phase structure.

3. A lightweight and excellent ductile bead wire for a bead core in a tire according to claim 1, wherein the composition further contains Cr: 1-7 at % as an additional component.

4. A method for producing a lightweight and excellent ductile bead wire for a bead core in a tire, which comprises rolling a steel ingot having a composition as claimed in claim 1 to form a wire rod, cooling the wire rod, heating to a temperature of 900-1100° C., quenching to render a steel structure into an austenite single-phase structure, drawing and then subjecting to a bluing treatment.

5. A lightweight tire comprising a bead wire for a bead core in a tire as claimed in claim 1.

* * * * *